(12) United States Patent
Liu et al.

(10) Patent No.: US 11,795,873 B1
(45) Date of Patent: Oct. 24, 2023

(54) MODULAR DESIGN OF TURBOEXPANDER COMPONENTS

(71) Applicant: Sapphire Technologies, Inc., Cerritos, CA (US)

(72) Inventors: Jeremy Liu, Norwalk, CA (US); Freddie Sarhan, Anaheim, CA (US); Ovais Ahmed Bin Najeeb, La Palma, CA (US); James Ryan Yates, Rancho Santa Margarita, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 0 days.

(21) Appl. No.: 17/930,153

(22) Filed: Sep. 7, 2022

(51) Int. Cl.
*F02C 6/00* (2006.01)
*H02K 7/09* (2006.01)
*H02K 7/18* (2006.01)

(52) U.S. Cl.
CPC .............. *F02C 6/00* (2013.01); *H02K 7/09* (2013.01); *H02K 7/1823* (2013.01); *F05D 2220/768* (2013.01); *H02K 2213/12* (2013.01)

(58) Field of Classification Search
CPC .......... F02C 6/00; H02K 7/09; H02K 7/1823; H02K 2213/12; F05D 2220/768
USPC .............................................. 290/52, 54, 43
See application file for complete search history.

(56) References Cited

U.S. PATENT DOCUMENTS

| | | |
|---|---|---|
| 3,508,090 A | 4/1970 | Crampton et al. |
| 5,689,175 A | 11/1997 | Hanson et al. |
| 7,408,268 B1 | 8/2008 | Nocentini et al. |
| 7,638,892 B2 | 12/2009 | Myers |
| 8,146,360 B2 | 4/2012 | Myers et al. |
| 8,384,232 B2 | 2/2013 | Myers et al. |
| 8,400,005 B2 | 3/2013 | Huber et al. |
| 8,739,538 B2 | 6/2014 | Myers et al. |
| 8,839,622 B2 | 9/2014 | Myers et al. |
| 2002/0060556 A1 | 5/2002 | Wall |
| 2004/0135436 A1 | 7/2004 | Gilbreth et al. |
| 2009/0165461 A1 | 7/2009 | Klassen et al. |
| 2010/0237619 A1* | 9/2010 | Pozivil ................... F02C 1/02 415/173.1 |
| 2011/0103110 A1 | 5/2011 | Godridge et al. |
| 2012/0013125 A1 | 1/2012 | Myers et al. |
| 2013/0286591 A1 | 10/2013 | Myers et al. |
| 2013/0300120 A1 | 11/2013 | Podrog |

(Continued)

FOREIGN PATENT DOCUMENTS

WO  WO202207684  1/2022

*Primary Examiner* — Charles Reid, Jr.
(74) *Attorney, Agent, or Firm* — Fish & Richardson P.C.

(57) ABSTRACT

An electric generator includes a process gas inlet on a downstream side of the flow control valve to receive process gas into the electric machine; a rotor shaft including a node position, the node position defining a position of a node of a first bending mode of the rotor shaft; a turbine wheel coupled to the rotor shaft at the node position, the turbine wheel configured to receive process gas and rotate in response to expansion of the process gas flowing into an inlet of the turbine wheel and out of the outlet of the turbine wheel, the rotor shaft configured to rotate with the turbine wheel, and a stationary stator, the electric generator to generate an alternating current upon rotation of the rotor within the stator. The turbine wheel selected from a plurality of turbine wheels based on the operational conditions of the electric generator.

19 Claims, 14 Drawing Sheets

(56) References Cited

U.S. PATENT DOCUMENTS

| | | |
|---|---|---|
| 2016/0338225 A1 | 11/2016 | Joshi et al. |
| 2016/0341014 A1 | 11/2016 | Flight et al. |
| 2017/0214335 A1 | 7/2017 | Basic et al. |
| 2018/0171832 A1* | 6/2018 | Kubo .................... F01K 27/02 |
| 2019/0044335 A1 | 2/2019 | Soverns et al. |
| 2019/0055899 A1 | 2/2019 | Munevar et al. |
| 2019/0153952 A1 | 5/2019 | Niergarth et al. |
| 2019/0366803 A1 | 12/2019 | Harris |
| 2021/0156308 A1 | 5/2021 | Jones |
| 2022/0074653 A1 | 3/2022 | Hoffman |
| 2022/0154568 A1 | 5/2022 | Fink et al. |
| 2022/0195848 A1 | 6/2022 | Olson et al. |
| 2022/0268143 A1 | 8/2022 | Fink et al. |

\* cited by examiner

MODULAR DESIGN OF TURBOEXPANDER COMPONENTS

BACKGROUND

The efficient and effective movement of gases from producing regions to consumption regions uses an extensive and elaborate transportation system. Gases transported via pipelines can be pressurized and can traverse long distances through pipelines at high pressures. For example, natural gas that is transported through pipelines travels at high pressure in the pipeline. Natural gas is one of the principal sources of energy for many of our day-to-day needs and activities. Natural gas is an attractive fossil fuel for its abundance and relative cleanliness. As another example, hydrogen can also be transported at high pressures using pipelines. Hydrogen is a rapidly expanding global energy storage market. Hydrogen is used in many manufacturing processes from petroleum refining to food processing. Hydrogen is also used as a fuel source for gas turbines and in a broad range of fuels cells to generate electricity in industrial and consumer transportation sectors. Other gases can also be transported through pipelines at high pressures, including propane, oxygen, carbon dioxide, and others.

SUMMARY

Aspects of the embodiments are directed to an apparatus that includes an electric generator. The electric generator can include a rotor shaft comprising a node position, the node position defining a position of a node of a first bending mode of the rotor shaft; a turbine wheel coupled to the rotor shaft at the node position, the turbine wheel configured to receive process gas and rotate in response to expansion of the process gas flowing into an inlet of the turbine wheel and out of the outlet of the turbine wheel, the rotor shaft configured to rotate with the turbine wheel; and a stationary stator, the electric generator to generate an alternating current upon rotation of the rotor within the stator.

In some embodiments, the electric generator comprises a first magnetic bearing at a first position and a second magnetic bearing at a second position, the turbine wheel coupled to the rotor shaft between the first magnetic bearing and the second bearing.

In some embodiments, the node of the first bending mode of the rotor shaft is proximate to the first position.

In some embodiments, the rotor shaft comprises a turbine wheel attachment interface compatible with a first turbine wheel comprising a first gas inlet size and a second turbine wheel comprising a second gas inlet size, the first gas inlet size different from the second gas inlet size.

In some embodiments, the electric generator further includes a housing assembly that includes a main housing supporting the stator; an inlet funnel removably affixed to a first flange of the main housing; and an inlet cone disposed within the inlet funnel and removably affixed to the main housing.

Some embodiments include an outlet funnel removably affixed to a second flange of the main housing; and an outlet cone disposed within the outlet funnel and removably affixed to the main housing.

In some embodiments, the turbine wheel is a first turbine wheel, the node of the first bending mode is a first node at a first node position, and the rotor shaft comprises a second node of the first bending mode at a second node position on the rotor shaft; and the electric generator comprises a second turbine wheel coupled to the rotor shaft at the second node position.

In some embodiments, the turbine wheel includes a shroud.

In some embodiments, the electric generator includes a plurality of electrical outlets, each of the plurality of electrical outlets configured to receive a blanking plate.

In some embodiments, the rotor shaft includes a plurality of permanent magnets.

Aspects of the embodiments are directed to a method that includes identifying an operational condition for an electric generator; selecting a turbine wheel, from a plurality of different turbine wheels, based on the operational condition; coupling the selected turbine wheel to a rotor shaft of the electric generator; and providing the electric generator.

In some embodiments, the operational condition comprises one or both of a process gas flow rate or a power output rating for the electric generator.

In some embodiments, the method also includes identifying a first bending mode node of the rotor shaft; wherein coupling the selected turbine wheel to a rotor shaft of the electric generator comprises coupling the selected turbine wheel to the rotor shaft at a location collocated with the node of the first bending mode.

In some embodiments, the method also include selecting an inlet cone and an inlet funnel based on the operational condition; and coupling the selected inlet cone and inlet funnel to a main housing of the electric generator.

In some embodiments, the method also includes selecting an outlet cone and an outlet funnel based on the operational condition; and coupling the selected outlet cone and outlet funnel to a main housing of the electric generator.

Aspects of the embodiments include a system that includes a flow control valve to control a flow of a process gas; and an electric generator. The flow control valve can control a mass flow rate of process gas or other gas into an inlet of the turboexpander. The flow control valve can work with a pressure control valve to control the pressure of the process gas input into the inlet of the turboexpander. The system also includes a process gas inlet on a downstream side of the flow control valve to receive process gas into the electric generator, a rotor shaft comprising a node position, the node position defining a position of a node of a first bending mode of the rotor shaft, a turbine wheel coupled to the rotor shaft at the node position, the turbine wheel configured to receive process gas and rotate in response to expansion of the process gas flowing into an inlet of the turbine wheel and out of the outlet of the turbine wheel, the rotor shaft configured to rotate with the turbine wheel, and a stationary stator, the electric generator to generate an alternating current upon rotation of the rotor within the stator.

In some embodiments, the electric generator comprises a first magnetic bearing at a first position and a second magnetic bearing at a second position, the turbine wheel coupled to the rotor shaft between the first magnetic bearing and the second bearing.

In some embodiments, wherein the node of the first bending mode of the rotor shaft is proximate to the first position.

In some embodiments, wherein the rotor shaft comprises a turbine wheel attachment interface compatible with a first turbine wheel comprising a first gas inlet size and a second turbine wheel comprising a second gas inlet size, the first gas inlet size different from the second gas inlet size.

In some embodiments, the electric generator further includes a housing assembly that includes a main housing supporting the stator; and an inlet funnel removably affixed to a first flange of the main housing.

BRIEF DESCRIPTION OF THE DRAWINGS

Like reference symbols in the various drawings indicate like elements. Drawings not to scale.

DETAILED DESCRIPTION

Natural gas, hydrogen, and other process gases are pressurized to facilitate efficient transportation in pipelines that are sometimes many miles long. The pipelines, for example, transport gasses from production sites (e.g., wells) to processing facilities and from processing facilities to local distribution networks, such as regional, city or district networks or on-site industrial plants networks. To deliver the gas safely through local distribution networks and for use, the process gas is depressurized to lower levels (often using pressure regulators). The pressure is stepped down at pressure letdown (PLD) stations for delivery to industrial, commercial, and residential end users. The PLD stations use regulating valves to achieve the required pressure drop, but also waste significant amounts of energy in the process. Additional regulating valves can be used at other locations for pressure control, such as in the pipelines between the production and processing facilities, within the sub-processes of the processing facilities, and within the end user's processes and piping. A turboexpander generator can be installed in parallel to the regulating valve to recover the wasted energy from pressure reduction and produce electrical power. The electrical power can be directed to a power grid or elsewhere. Along the same lines, a turboexpander generator can be installed at a gas storage facility upstream of one or more storage tanks to recover high pressure gasses dispensed from a tanker truck, through the turboexpander generator, to the storage tanks. The turboexpander generator is relevant in other applications, such as in a hydrogen liquefaction process where gaseous hydrogen that has been cooled and pressurized is expanded to a liquid state. The expansion can be performed through a turboexpander generator to recover the wasted energy from the expansion and produce electrical power. As above, the electrical power can be directed to a power grid or elsewhere, such as used to power compressors or other components of the liquefaction process. In each instance, by recovering lost energy from natural gas and hydrogen pressure letdown applications, the turboexpander can generate electricity while also reducing $CO_2$ emissions, increasing overall plant efficiency, offsetting electrical costs, and generating additional revenue.

The power grid that the turboexpander can supply power to (and draw power from) can be a national or regional power grid, a local power grid for a city or district, or a small grid, local grid, or microgrid, such as an on-site grid that supplies power to a building, campus, industrial manufacturing or processing plant, or neighborhood.

Figure 1:
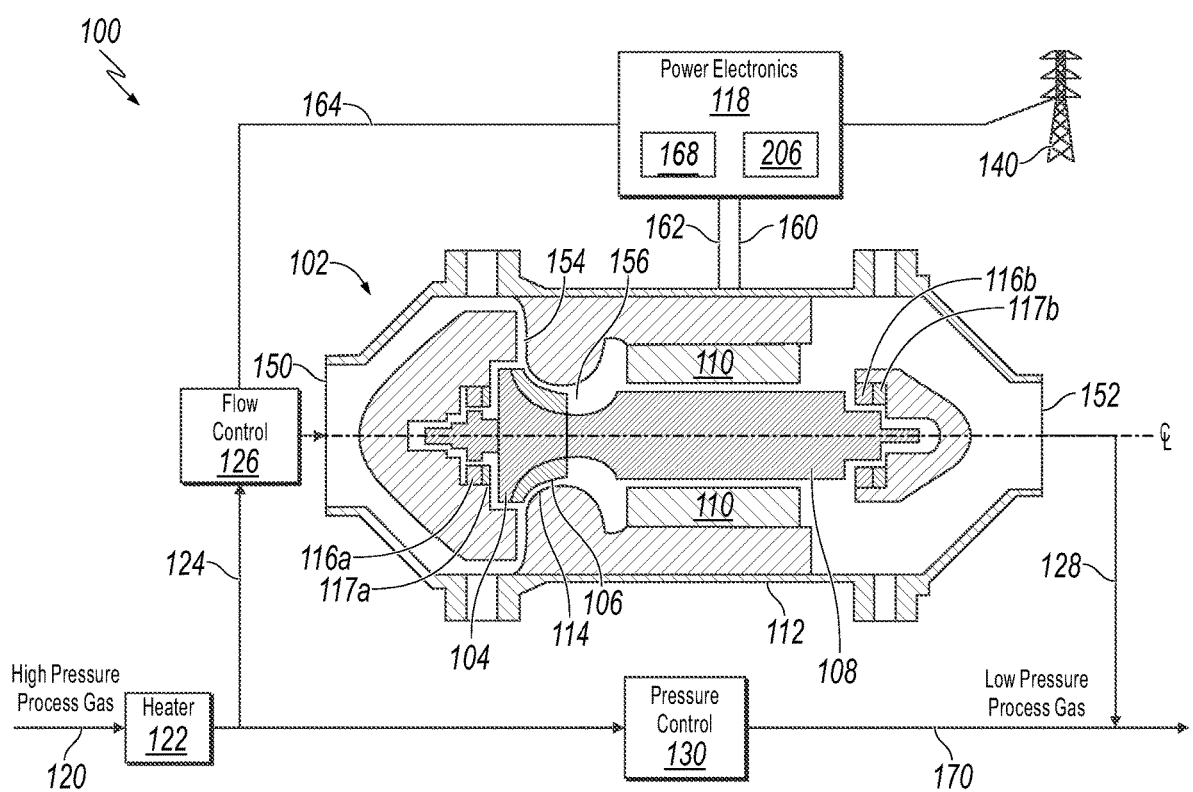
FIG. 1 is a schematic diagram of an electric power generation system coupled to a power grid in accordance with embodiments of the present disclosure.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process, or in any of the other applications described above. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

The turboexpander 102 can include a high-performance, high-speed permanent magnet generator. In certain embodiments, the turboexpander 102 includes a radial in-flow expansion turbine wheel 104. Turboexpander 102 can also include low loss active magnetic bearings (AMBs) 116a,b. The rotor assembly can include permanent magnet section with the turbine wheel 104 mounted directly to the rotor hub. The rotor 108 can be levitated by the magnetic bearing system creating a frictionless (or near frictionless) interface between dynamic and static components. The AMBs 116a,b facilitate a lossless (or near lossless) rotation of the rotor 108.

The turboexpander 102 is shown to have the process gas flow through the system, which cools the generator section and eliminates the need for auxiliary cooling equipment. In some embodiments, non-flow-through overhung systems can also be implemented. The power electronics 118 for turboexpander combines a Variable Speed Drive (VSD) 206 and Magnetic Bearing Controller (MBC) 168 into one cabinet, in some implementations. The VSD allows for a consistent and clean delivery of generated power from the turboexpander 102 to a power grid 140. The VSD 206 regulates the frequency and amplitude of the generated current to match the local grid. After expansion, the gas exits the turboexpander 102 along the same axial path for downstream processes.

The turboexpander 102 is shown as having a flow-through configuration. The flow-through configuration permits process gas to flow from an inlet side of the turboexpander 102 to an outlet side of the turboexpander 102. The gas flows into a radial gas inlet 154 to a turbine wheel 104 and an axial gas outlet 156 from the turbine wheel 104. The gas then flow through the generator and out of the outlet 156, where the gas rejoins the gas pipeline 170. Generally, high pressure process gas 120 is directed to flow into the turboexpander 102 through a flow control system 126. The flow control system 126 includes a flow or mass control valve and an emergency shut off valve. Flow control system 126 can be controlled electrically from power electronics 118 by control line 164. In embodiments, the turboexpander housing 112 is hermetically sealed. As mentioned above, the turboexpander can be non-flow-through and overhung without deviating from the scope of this disclosure. The high pressure process gas 120 is expanded by flowing through the turbine wheel 104, resulting in a pressure letdown of the process gas. Lower pressure process gas 128 exits the turboexpander. The expansion of the high pressure process gas 120 through the turbine wheel 104 causes the turbine wheel 104 to rotate, which causes the rotor 108 to rotate. The rotation of the rotor 108 within the stator 110 generates electrical energy. The turboexpander 102 achieves the desired pressure letdown and captures the energy from the pressure letdown to generate electricity. A pressure control valve 130, such as a conventional pressure regulator, can be installed in parallel to the turboexpander 102. The pressure control valve 130 can be used to control the pressure of the high pressure process gas 120 that flows through the turboexpander. Any excess high pressure process gas that is not directed into the turboexpander can be directed through the pressure control valve 130.

In some embodiments, a heater 122 can heat the high pressure process gas 120 prior to flowing the gas into the turboexpander 102. For example, if the expansion of the gas through the turbine wheel 104 lowers the temperature of the process gas to a point where moisture in the gas freezes at the turbine wheel or other downstream locations in the pipeline, the pressurized process gas 120 can be heated by heater 122. Heated high pressure process gas 124 can then be directed into the turboexpander 102. The heating of the process gas can prevent freezing moisture as the gas expands and its temperature drops.

The turboexpander 102 includes a turbine wheel 104. The turbine wheel 104 is shown as a radial inflow turbine wheel, though other configurations are within the scope of this disclosure, such as axial flow turbine wheels. In this example, heated high pressure process gas 124 is received from an inlet conduit 150 of the housing 112 enters a radially oriented inlet 154 of the turbine wheel 104. In certain embodiments, the fluid flows through an inlet conduit 150 and is diverted by a flow diverter to a radial inlet 154 that directs the flow into the radial inflow of the turbine wheel 104. After expanding, the lower pressure process gas exits the turbine wheel 104 from an axially oriented outlet 156 to outlet conduit 152 of the housing 112.

The turbine wheel 104 can be directly affixed to the rotor 108, or to an intermediate common shaft, for example, by fasteners, rigid drive shaft, welding, or other manner. For example, the turbine wheel 104 may be received at an end of the rotor 108, and held to the rotor 108 with a shaft. The shaft threads into the rotor 108 at one end, and at the other, captures the turbine wheel 104 between the end of rotor 108 and a nut threadingly received on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that react with the expanding process gas to cause the turbine wheel 104 to rotate. FIG. 1 shows an unshrouded turbine wheel, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas therebetween, as the process gas flows through the turbine wheel 104. Although some amount of the process gas may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turbine generator may be optimized to reduce the leakage. In embodiments, the housing 112 is hermetically sealed to prevent process gases from escaping the radial inlet 154 of the turbine wheel 104.

The shroud 114 may reside at a specified distance away from the turbine wheel blades 106, and is maintained at a distance away from the turbine wheel blades 106 during operation of the turboexpander 102 by using magnetic positioning devices, including active magnetic bearings and position sensors.

Bearings 116a and 116b are arranged to rotatably support the rotor 108 and turbine wheel 104 relative to the stator 110 and the shroud 114. The turbine wheel 104 is supported in a non-cantilevered manner by the bearings 116a and 116b. In embodiments, the turbine wheel 104 may be supported in a cantilevered manner and bearings 116a and 116b may be located on the outlet side of turbine wheel 104. In certain instances, one or more of the bearings 116a or 116b can include ball bearings, needle bearings, magnetic bearings, foil bearings, journal bearings, or others.

Bearings 116a and 116b may be a combination radial and thrust bearing, supporting the rotor 108 in radial and axial directions. Other configurations could be utilized. The bearings 116a and 116b need not be the same types of bearings.

In the embodiments in which the bearings 116a and 116b are magnetic bearings, a magnetic bearing controller (MBC) 168 is used to control the magnetic bearings 116a and 116b.

Position sensors 117a, 117b can be used to detect the position or changes in the position of the turbine wheel 104 and/or rotor 108 relative to the housing 112 or other reference point (such as a predetermined value). Position sensors 117a, 117b can detect axial and/or radial displacement. The magnetic bearing 116a and/or 116b can respond to the information from the positions sensors 117a, 117b and adjust for the detected displacement, if necessary. The MBC 168 may receive information from the position sensor(s) 117a, 117b and process that information to provide control signals to the magnetic bearings 116a, 116b. MBC 168 can communicate with the various components of the turboexpander 102 across a communications channel 162.

The use of magnetic bearings 116a, 116b and position sensors 117a, 117b to maintain and/or adjust the position of the turbine wheel blades 106 such that the turbine wheel blades 106 stay in close proximity to the shroud 114 permits the turboexpander 102 to operate at high efficiencies. The use of the active magnetic bearings 116a,b in the turboexpander 102 eliminates physical contact between rotating and stationary components, as well as eliminate lubrication and lubrication systems. In some embodiments, brush seals can be used to prevent gas leakage. The magnetic bearings 116a,b and position sensors 117a,b allow for the rotor to stay in close proximity to the brush seals.

The turboexpander 102 may include one or more backup bearings. For example, at start-up and shut-down or in the event of a power outage that affects the operation of the magnetic bearings 116a and 116b, bearings may be used to rotatably support the turbine wheel 104 during that period of time. The backup bearings may include ball bearings, needle bearings, journal bearings, or the like. As mentioned previously, the turboexpander 102 is configured to generate electricity in response to the rotation of the rotor 108. In certain instances, the rotor 108 can include one or more permanent magnets. The stator 110 includes a plurality of conductive coils. Electrical current is generated by the rotation of the magnet within the coils of the stator 110. The rotor 108 and stator 110 can be configured as a synchronous, permanent magnet, multiphase alternating current (AC) generator. The electrical output 160 can be a three-phase output, for example. In certain instances, stator 110 may include a plurality of coils (e.g., three or six coils for a three-phase AC output). When the rotor 108 is rotated, a voltage is induced in the stator coil. At any instant, the magnitude of the voltage induced in coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electricity at that speed. Such a turboexpander 102 is what is referred to as a "high speed" turbine generator. For example, in embodiments, the turboexpander 102 can produce up to 280 kW at a continuous speed of 30,000 rpm. In embodiments, the turboexpander can produce on the order of 350 kW at higher rotational speeds (e.g., on the order of 35,000 rpm).

In some embodiments, the design of the turbine wheel 104, rotor 108, and/or stator 110 can be based on a desired parameter of the output gas from the turboexpander 102. For example, the design of the rotor and stator can be based on a desired temperature of the gas 128.

The turboexpander 102 can be coupled to a power electronics 118. Power electronics 118 can include a variable speed drive (VSD) 206 (or variable frequency drive) and the magnetic bearing controller (MBC) 168 (discussed above).

The electrical output 160 of the turboexpander 102 is connected to the VSD 206, which can be programmed to specific power requirements. The VSD 206 can include an insulated-gate bipolar transistor (IGBT) rectifier to convert the variable frequency, high voltage output from the turboexpander 102 to a direct current (DC). The rectifier 210 can be a three-phase rectifier for three-phase AC input current. An inverter then converts the DC from the rectifier AC for supplying to the power grid 140. The inverter can convert the DC to 380 VAC-480 VAC at 50 to 60 Hz for delivery to the power grid. The specific output of the VSD 206 depends on the power grid and application. Other conversion values are within the scope of this disclosure. The VSD 206 matches its output to the power grid 140 by sampling the grid voltage and frequency, and then changing the output voltage and frequency of the inverter to match the sampled power grid voltage and frequency.

The turboexpander 102 is also connected to the MBC 168 in the power electronics 118. The MBC 168 constantly monitors position, current, temperature, and other parameters to ensure that the turboexpander 102 and the active magnetic bearings 116a and 116b are operating as desired. For example, the MBC 168 is coupled to position sensors 117a, 117b to monitor radial and axial position of the turbine wheel 104 and the rotor 108. The MBC 168 can control the magnetic bearings 116a, 116b to selectively change the stiffness and damping characteristics of the magnetic bearings 116a, 116b as a function of spin speed. The MBC 168 can also control synchronous cancellation, including automatic balancing control, adaptive vibration control, adaptive vibration rejection, and unbalance force rejection control.

Pressure let down systems convert shaft power from the process flow. The turboexpander can support islanding operations. The turboexpander can continue to provide power to a location in the event that a power grid supplying power to that location is interrupted. This disclosure describes components that can facilitate load matching between the shaft power created by the process gas flow at the pressure letdown station to load demands. In this way, the turboexpander can support microgrid functionality for islanding operations.

The turboexpander 102 described above includes example features that are implementation-specific. Certain features may be changed, added, removed, or redesigned without deviating from the scope of this disclosure. For example, other types of bearings can be used instead of or in addition to AMBs, such as ball bearings, fluid film bearings, etc. Different designs of rotors and stators can be used, such as brushless DC, induction-type, etc. Other types of stator cooling architectures can be used, such as non-flow-through and overhung architectures.

Figure 2:
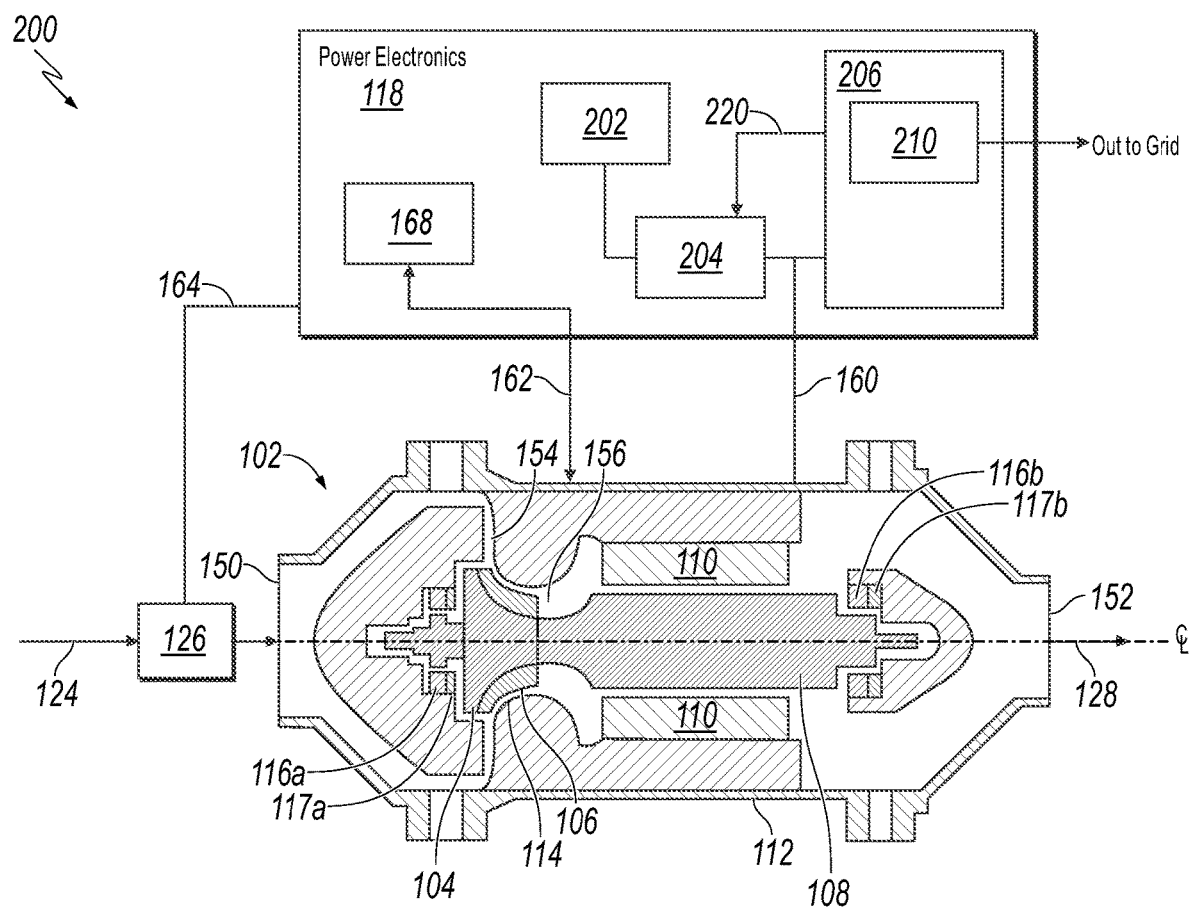
FIG. 2 is a schematic diagram of an example turboexpander system that includes a modular rotor assembly in accordance with embodiments of the present disclosure.

FIG. 2 is a schematic diagram of an example turboexpander system 200 that includes a modular rotor assembly in accordance with embodiments of the present disclosure. Turboexpander system 200 includes a turboexpander 102 and a power electronics 118. The turboexpander 102 receives a heated high pressure process gas 124, which causes a turbine wheel 104 to rotate. The rotation of the turbine wheel 104 rotates a rotor 108 that supports a plurality of permanent magnets. The rotation of the permanent magnets on the rotor 108 induces a current through coils or windings on stator 110.

Some turbomachines have overhung impellers, in which the impeller is placed outside of a bearing span. Typically 2 nodes of the first bending mode of the rotor are located between a bearing span. By moving an impeller within the bearing span and onto one of these nodes, the impeller will have little to no displacement and as a result have limited influence on rotordynamics of the rotor assembly. With the impeller located on a node, the impeller can be interchangeable with other impeller designs to match specific applications and to conform to bearing tuning of the turbomachine (including magnetic bearing tuning). It is also applicable to tuned damping of rolling element bearings. In either case, this allows a single machine and bearing design to accommodate various applications.

The electric generator system acts as a brake on the rotor 108. This braking torque converts the shaft power, created by the process gas flow, to electrical power that can be put on an electrical grid, for example. In the case of a grid failure, inverter failure, or other fault condition, braking torque is lost and the rotor 108 may spin up towards an undesirable overspeed. To prevent overspeed, the power can be diverted to a brake resistor assembly 202 that can temporarily absorb the electricity until the process gas flow is reduced or removed (e.g., by flow control system 126) or until the fault condition is resolved. Flow control system 126 can include a one or a combination of a flow control valve or a mass control valve or an emergency shutoff valve. Flow control system 126 can be controlled by power electronics 118 or other electrical, mechanical, or electromagnetic signal. For example, a fault condition can signal the flow control system 126 to close or partially close, thereby removing or restricting gas supply to the turboexpander 102. Restricting or removing gas flow to the turboexpander slows the rotation of the turbine wheel and consequently, slows the rotor. In the example shown in FIGS. 1 and 2, a control line 164 from the power electronics 118 can be used to open and/or close the flow control system 126.

A fault condition can include a grid failure, VSD failure, inverter failure, or other fault condition. A fault condition can include any condition that removes or reduces the braking torque on the rotor 108.

A brake resistor assembly 202 is electrically connected to the electrical output 160 of the turboexpander 102 (e.g., the output of the generator). The brake resistor assembly 202 can have a tuned impedance to allow an efficient transfer of power from the turboexpander 102 to the brake resistor assembly 202.

In embodiments, a contactor 204 can connect the output current of the turboexpander 102 to the brake resistor assembly 202 when there is a fault condition at the VSD 206 or the power grid 140. The contactor 204 is an electrically controlled switch for switching in an electrical power circuit. The contactor 204 can accommodate the three-phase current output from the generator to direct the current to the brake resistor assembly 202. In some embodiments, the contactor 204 is connected directly to the (three-phase) electrical output 160 of the turboexpander 102. In some embodiments, the brake resistor assembly 202 and/or the contactor 204 are not part of the power electronics, but are connected to the electrical output 160 of the turboexpander 102 outside of the power electronics 118.

The VSD 206 can provide an energizing signal 220 to the coil of the contactor 204 to cause the contactor 204 to connect the electrical output 160 of the turboexpander to the brake resistor assembly 202. Depending on the implementation choice, the contactor 204 can be a normally closed (NC) contactor or a normally open (NO) contactor. For example, in an example implementation using a NO contactor, during normal operating conditions, the electrical output 160 of the turboexpander 102 is connected to the VSD 206 and supplies three-phase AC current to the VSD 206. In a fault condition, the VSD can energize the contactor to connect the contactor to the electrical output 160 of the turboexpander 102. In some implementations, the energizing signal 220 to the contactor can be provided by another source that can respond to a fault condition (e.g., another component of the power electronics 118 or another component outside the power electronics 118). In this implementation, if failure of the VSD 206 is the cause of the fault condition, the contactor can operate independent of the VSD 206.

If an NC contactor is used, then the VSD 206 (or other source) provides an energizing signal 220 to the contactor 204 to keep the contactor switches open during normal operating conditions. A fault condition can result in the removal of the energizing signal 220 to the contactor, which results in the contactor switches closing and completing the circuit between the electrical output 160 of the turboexpander 102 and the brake resistor assembly 202.

In some embodiments, the brake resistor 202 can be disconnected from the electrical output 160 of the turboexpander 102 when operational states return to normal.

The electrical output of the turboexpander can be dependent on the rotational speed of the rotor. The rotational speed of the rotor is based on the process gas flow rate and the structure of the turbine wheel. A single turboexpander can be used to accommodate different power ratings or process gas flows by using a modular design of the turbine wheel as well as a modular design for various structural components of the turboexpander. This disclosure describes several design considerations to achieve modularity in the turboexpander to accommodate for different applications. This disclosure describes a rotor design for turbine wheel interchangeability.

Arrangement of the turbine wheel on a high speed rotor at a node of rotor shaft defined by the first bending mode of the rotor shaft mitigates the effects the turbine wheel has on rotor dynamics of the rotor assembly because the turbine wheel will experience little to no displacement during operation. Reducing or eliminating turbine wheel displacement during operation allows for the interchangeability of turbine wheels with minimal adjustments to bearing tuning, including magnetic bearing tuning and with respect to tuned dampening of rolling element bearings. In either case, this allows a single machine and bearing design to accommodate various applications. The nodes of the first bending mode of a rotor shaft can be theoretically predicted using finite element analysis or numerical analysis techniques.

Modularity of turbine wheel design and the design of other components of the turboexpander allow for different applications, such as for different process flow rates or mass flow to be used on the same machine. Different applications can be supported by changing one or more modular components. The standardization of the design of the turboexpander housing and other components lends to increased reliability of the whole machine. In addition, standardization also results in reduced costs for manufacturing and use, since the same machine can be used in a different application by changing a few parts, as opposed to using a whole new machine. Also, modularity and standardization support using similar control files between machines.

First, the rotor shaft can be designed so that the turbine wheel structure can be modular. That is, the rotor shaft is designed so that different structures of turbine wheels can be secured to the rotor shaft without affecting the frequency response of the rotor shaft or the control of the magnetic bearings that support the frictionless rotation of the rotor within the stator. A rotating rotor can demonstrate bending modes. A mode of oscillation is characterized by a modal frequency and a mode shape. Each mode is numbered according to the number of half waves in the vibration. For example, if an oscillating rotor with both ends secured displayed a mode shape of half of a sine wave (one peak on the oscillating rotor), the rotor would be oscillating in mode 1 (or, here, first bending mode). In a one-dimensional system at a given mode the oscillation will have nodes, or places along the rotor where the oscillation (or sinusoidal) displacement is always zero. The nodes correspond to points in the mode shape where the mode shape is zero.

Figure 3:
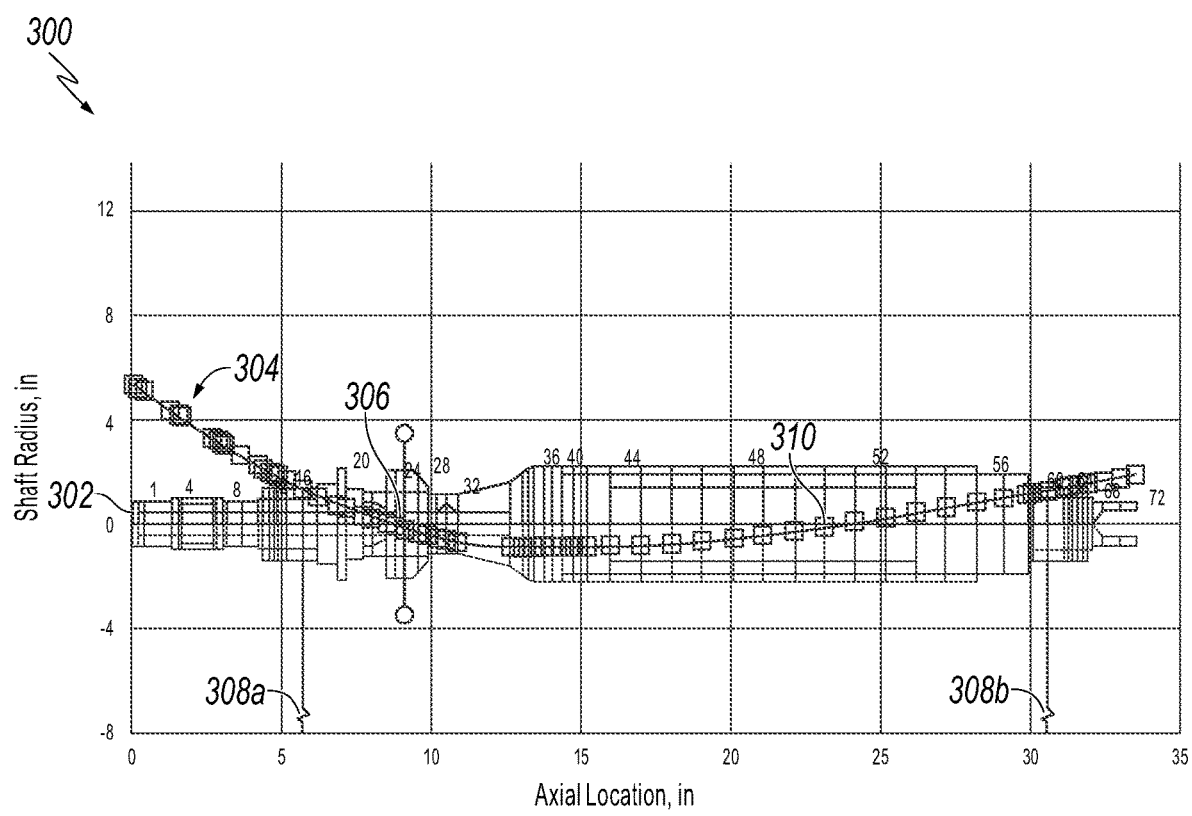
FIG. 3 is a schematic diagram of a graphical representation of a first example rotor bending mode in accordance with embodiments of the present disclosure.

This disclosure describes designing the turboexpander and various components so that the turbine wheel can be collocated with a node of the rotor. FIG. 3 is a schematic diagram of a graphical representation 300 of an example rotor bending mode in accordance with embodiments of the present disclosure. In FIG. 3, a first bending mode sinusoid 304 is mapped to a rotor shaft 302 graphically. The node 306 is identified as a point along the first bending mode sinusoid 304 where the first bending mode sinusoid 304 crosses the center (0 inches of shaft radius) of the rotor shaft 302. The first bending mode shape is tuned in such a way that the center of mass of the wheel is placed on the node 306 with the magnetic bearing support locations 308a and 308b outside the wheel. Bearing targets or sections of the rotor can be adjusted to correctly place the wheel onto node 306.

Figure 4A:
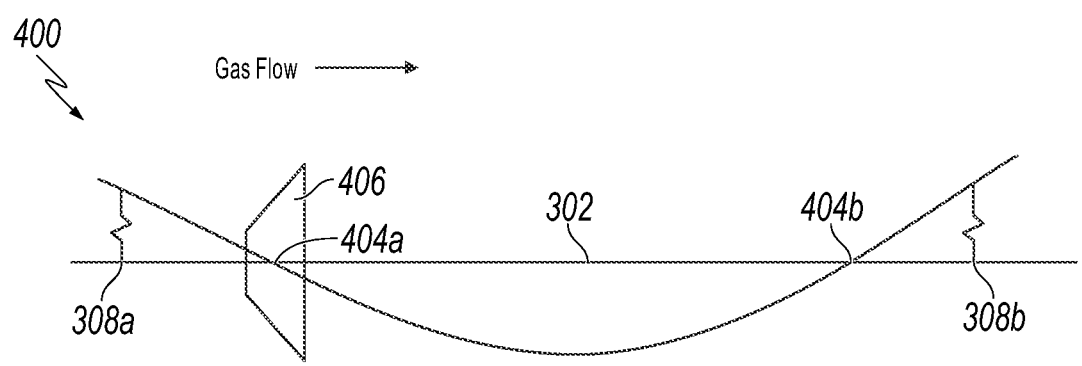
FIGS. 4A-D are schematic diagrams illustrating example wheel locations along a rotor shaft collocated with one or both of the first bending mode node positions in accordance with embodiments of the present disclosure.
Figure 4B:
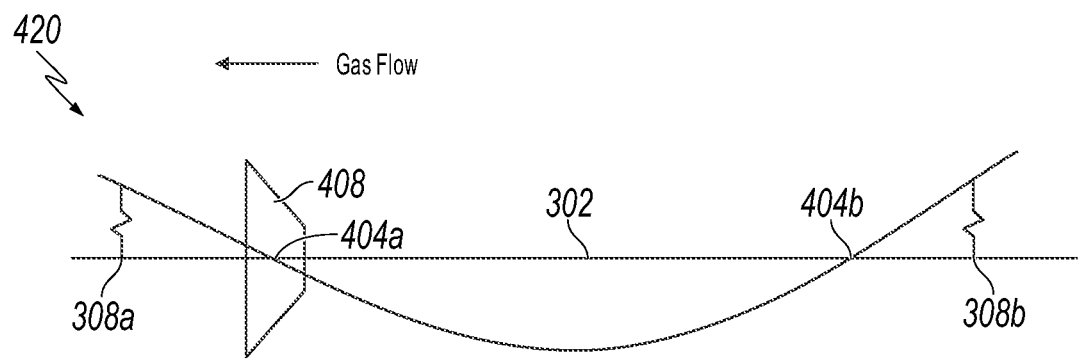
Figure 4C:
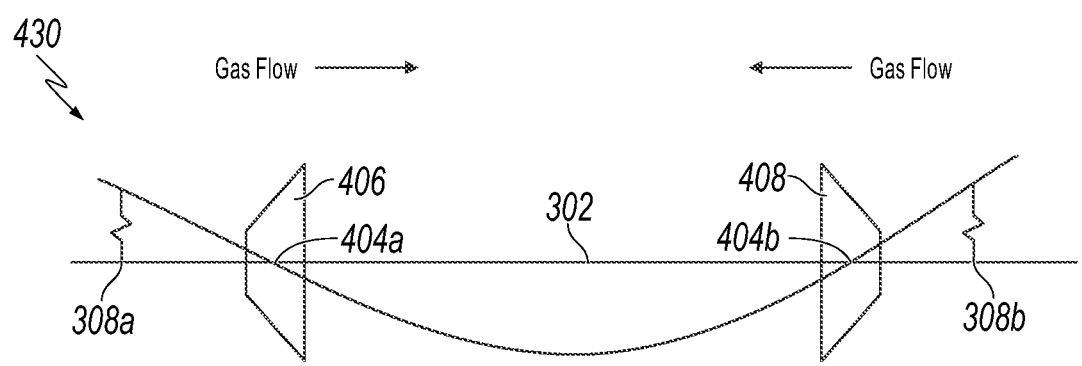
Figure 4D:
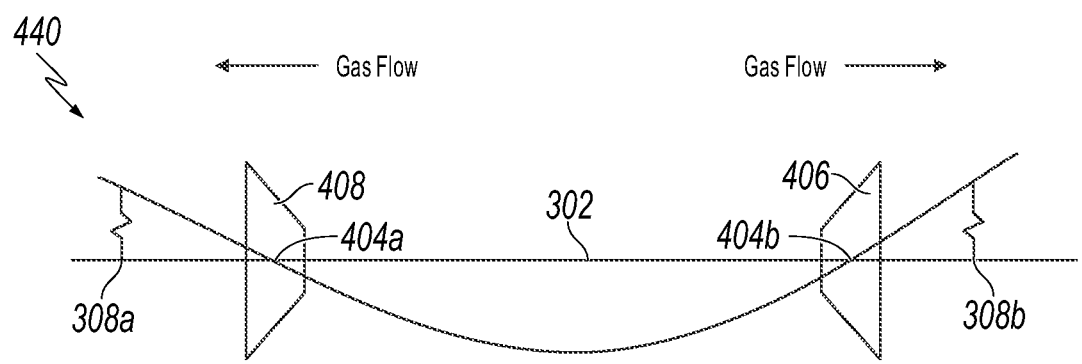

As can be seen in FIG. 3, a node exists in two places along the rotor shaft 302 (e.g., at first node position 306 and at second node position 310). A turbine wheel or other type of wheel can be placed on either side or both sides of the rotor shaft 302 with both magnetic bearings placed outside of both wheels. FIGS. 4A-D are schematic diagrams illustrating example wheel locations along a rotor shaft collocated with one or both of the node positions in accordance with embodiments of the present disclosure. The placement of the wheel on the node can occur with process fluid flow going towards the middle of the machine or away from the middle of the machine. FIGS. 4A-4D show a turboexpander 400, 420, 430 and 440. Each of turboexpander 400, 420, 430, and 440 includes a rotor shaft 302 supported by magnetic bearings 308a and 308b. The rotor shaft 302 has two nodes 404a and 404b. For example, FIG. 4A shows a first configuration of a turboexpander 400. In turboexpander 400, the process gas flows towards the middle of the rotor shaft 302. The wheel 406 is positioned at node 404a. FIG. 4B shows a second configuration of a turboexpander 420. In turboexpander 420, the process gas flows away from the middle of the rotor shaft 302. The wheel 408 is positioned at node 404a. FIG. 4C shows a third configuration of a turboexpander 430. In turboexpander 430, two wheels can be used. The process gas flows towards the middle of the rotor shaft 302. A first wheel 406 can be positioned at node 404a and a second wheel 408 can be positioned at node 404b. FIG. 4D shows a fourth configuration of a turboexpander 440. In turboexpander 440, two wheels can be used. The process gas flows away from the middle of the rotor shaft 302. A first wheel 406 can be positioned at node 404b and a second wheel 408 can be positioned at node 404a.

Placing the wheel at the node of the rotor shaft 302 allows for the turboexpander to use an integrated aero design, as opposed to an overhung machine, where the aero section is bolted on the end of the machine. The magnetic bearings support the integrated aero design. The turbine wheel placement at the node of the rotor shaft facilitates the integrated aero design without compromising the magnetic bearings. The turbine wheel placement does not impact balance or oscillation, allowing the magnetic bearings to support the rotation of the rotor within the stator while also accommodating for variation in turbine wheel selection. Put simply, a heavier or lighter turbine wheel does not affect the magnetic bearing's support of the rotor shaft as the rotor shaft rotates. Any first mode oscillation or vibration of the rotor shaft during rotation is not sensitive to mass or inertia at the node.

For magnetic bearing control, the frequency response of the first bending mode can impact the control of the magnetic bearing. Placement of the turbine wheel on a node mitigates the impact of changing the turbine wheel with respect to frequency response and magnetic bearing control. In addition, the turbine wheels are not magnetic components. So, the placement of the turbine wheel at a node of the rotor shaft and near the magnetic bearings will not impact magnetic bearing functionality.

Figure 5A:
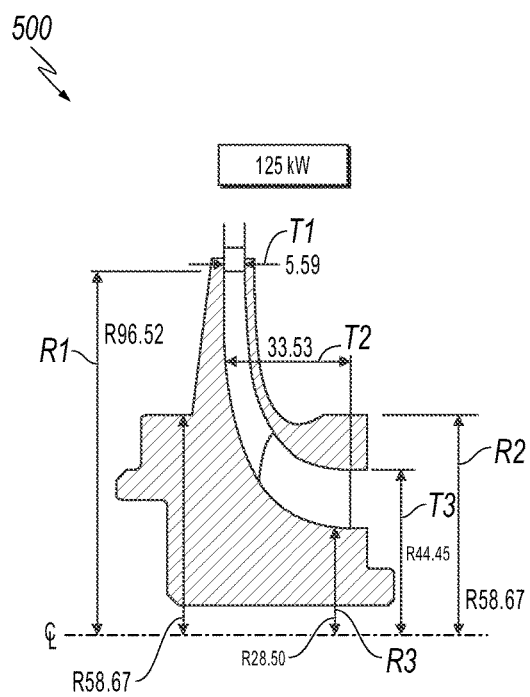
FIGS. 5A-B are schematic diagrams illustrating turbine wheel designs in accordance with embodiments of the present disclosure.
Figure 5B:
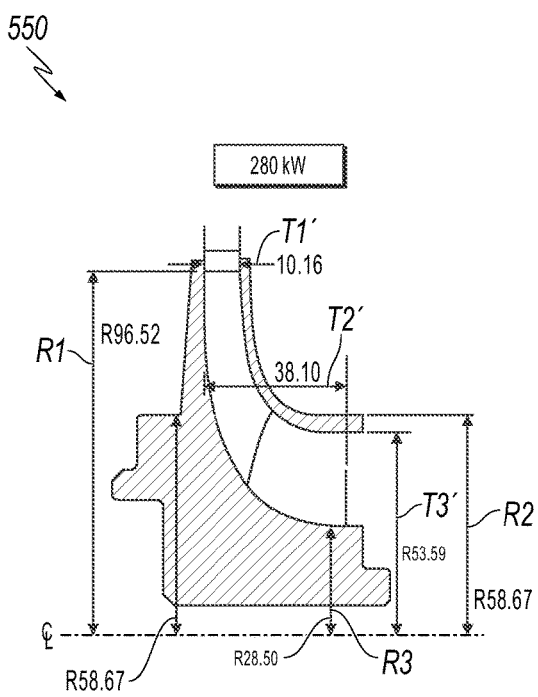

FIGS. 5A-B are schematic diagrams illustrating turbine wheel designs in accordance with embodiments of the present disclosure. FIG. 5A is a schematic diagram of a first turbine wheel design 500 for a 125 kW power rated turboexpander in accordance with embodiments of the present disclosure. FIG. 5B is a schematic diagram of a second turbine wheel design 550 for a 280 kW power rated turboexpander in accordance with embodiments of the present disclosure. The example dimensions for the first turbine wheel design 500 and the second turbine wheel design 550 are illustrated to highlight both the differences and similarities in certain dimensions between the two. For example, both first turbine wheel design 500 and the second turbine wheel design 550 include the same dimensions for R1, R2, and R3. The common dimensions for R1, R2, and R3 allow both turbine wheels to be secured to a common rotor shaft and fit within the housing of the turboexpander. The turbine wheel designs 500 and 550 are designed with common interfaces to allow for interchangeability between wheels. The common interfaces include shaft interfaces, common tie bolt, and common brush seal interfaces. This commonality between the turbine wheel designs provides consistent moment stiffness on unchanged parts of the rotor so that the node of the rotor shaft can be collocated with either turbine wheel design.

The differences in turbine wheel designs 500 and 550 include dimensions for accommodating process flow gas to produce higher rotational rates to generate more power. For example, first turbine wheel design 500 is designed for 125 kW output. First turbine wheel design 500 includes a process gas inlet opening T1, an expansion chamber thickness T2, and a process gas outlet T3. Second turbine wheel design 550 includes a process gas inlet opening T1', an expansion chamber thickness T2', and a process gas outlet T3', where T1'>T1, T2'>T2, and T3'>T3. Both first turbine wheel design 500 and second turbine wheel design 550 can be secured to the same rotor shaft 302, but can produce different rotational rates from the same process gas flow, thereby causing different power ratings to be generated. In some embodiments, second turbine wheel design 550 can accommodate higher process gas flow rates than the first turbine wheel design 500, but can still be fit onto a common rotor shaft 302.

Figure 6A:
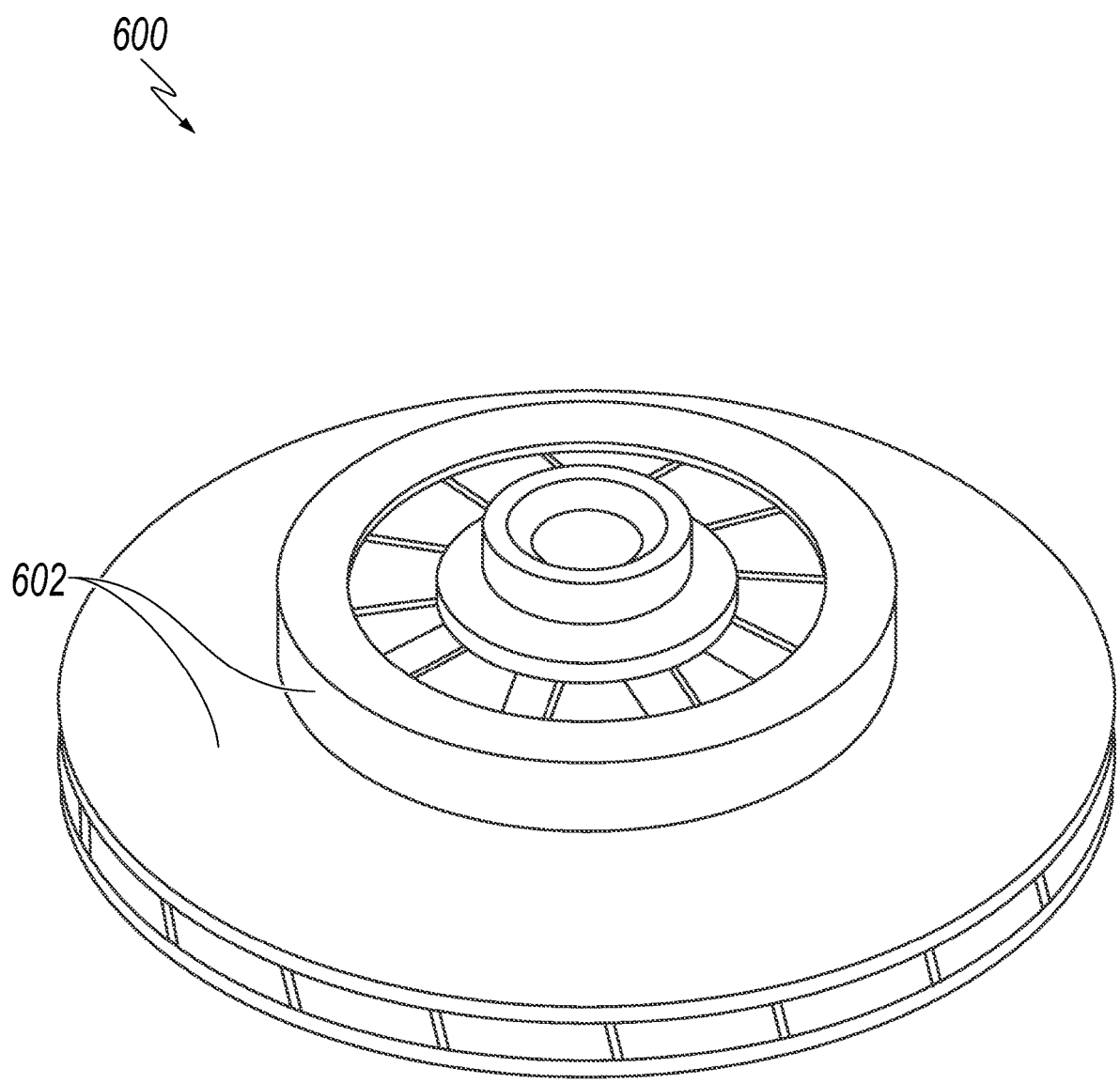
FIGS. 6A-B are schematic diagrams of example turbine wheel designs in accordance with embodiments of the present disclosure.
Figure 6B:
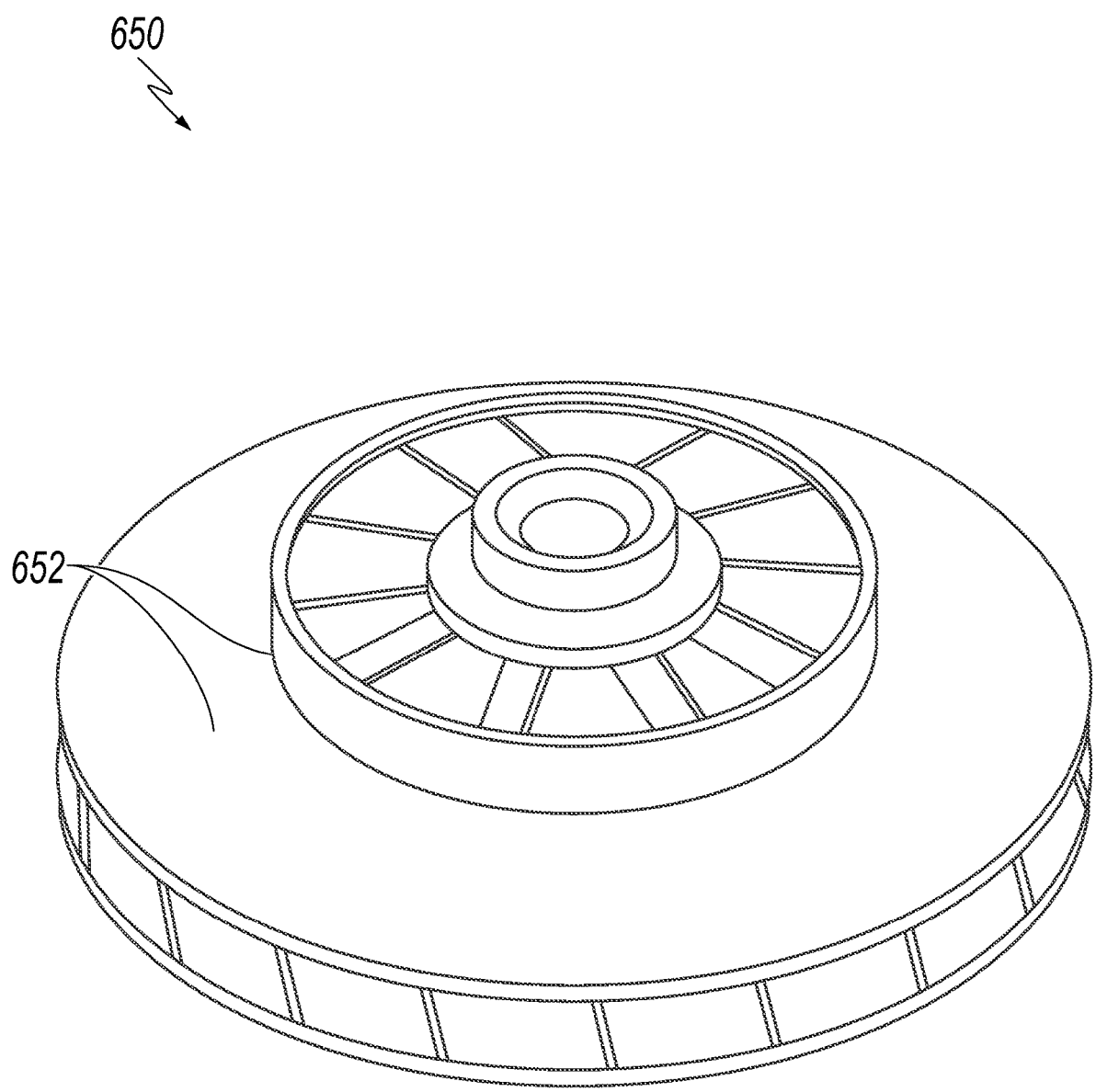

FIGS. 6A-B are schematic diagrams of example turbine wheel designs in accordance with embodiments of the present disclosure. In FIG. 6A, a first turbine wheel design 600 is shown. First turbine wheel design 600 can be similar to first turbine wheel design 500 described above. In FIG. 6B, a second turbine wheel design 650 is shown. Second turbine wheel design 650 can be similar to first turbine wheel design 500 described above. First turbine wheel design 600 and second turbine wheel design 650 are "shrouded" turbine wheels. The first turbine wheel design 600 includes a shroud 602 that protects turbine wheel blades from abrasion the blades spin and as the rotor rotates. The second turbine wheel design 650 includes a shroud 652 that protects turbine wheel blades from abrasion the blades spin and as the rotor rotates. In some embodiments, the turbine wheel can be constructed without a shroud. The turbine wheel blades can be designed to ablate during operation. The turbine wheel can also be constructed to accommodate a modular shroud that can be assembled onto the turbine wheel prior to installation.

Both of the first turbine wheel design 600 and the second turbine wheel design 650 can be made using additive manufacturing techniques, such as three-dimensional (3D) printing.

Figure 7A:
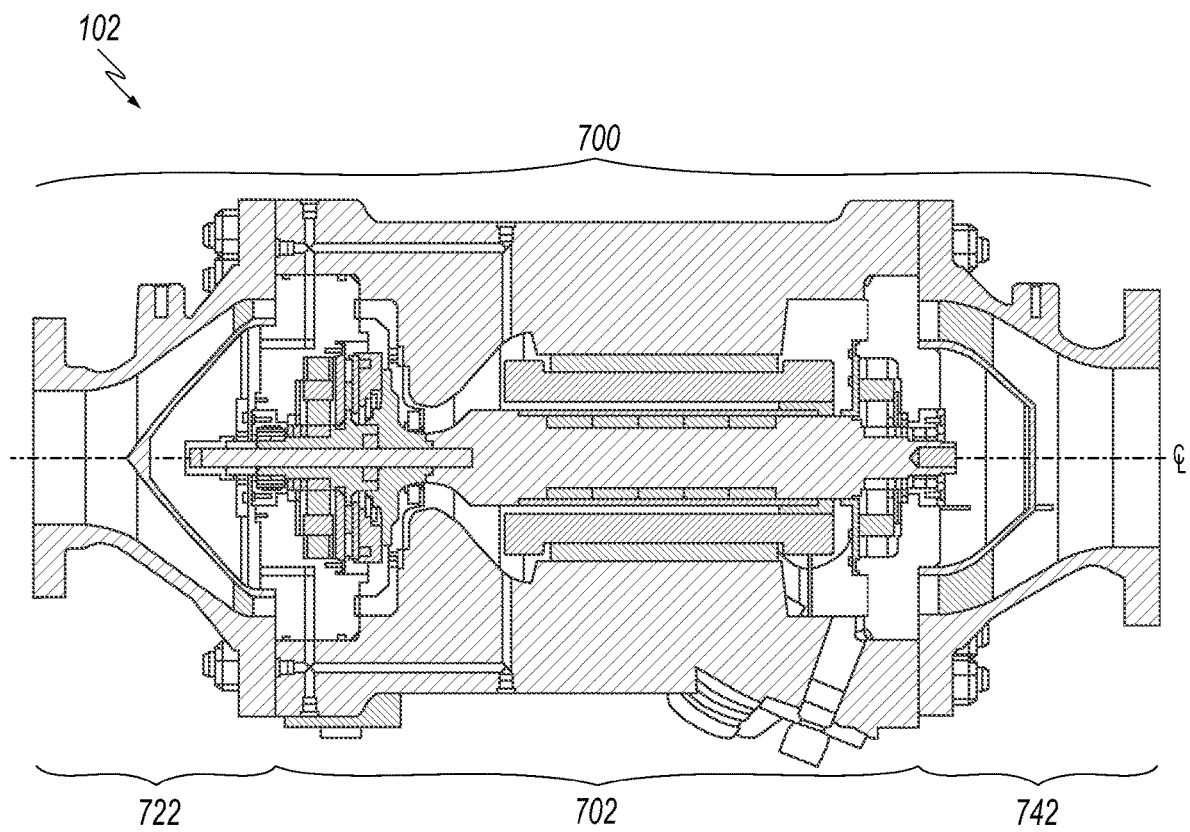
FIGS. 7A-D are schematic diagrams illustrating the turboexpander housing components in accordance with embodiments of the present disclosure.
Figure 7B:
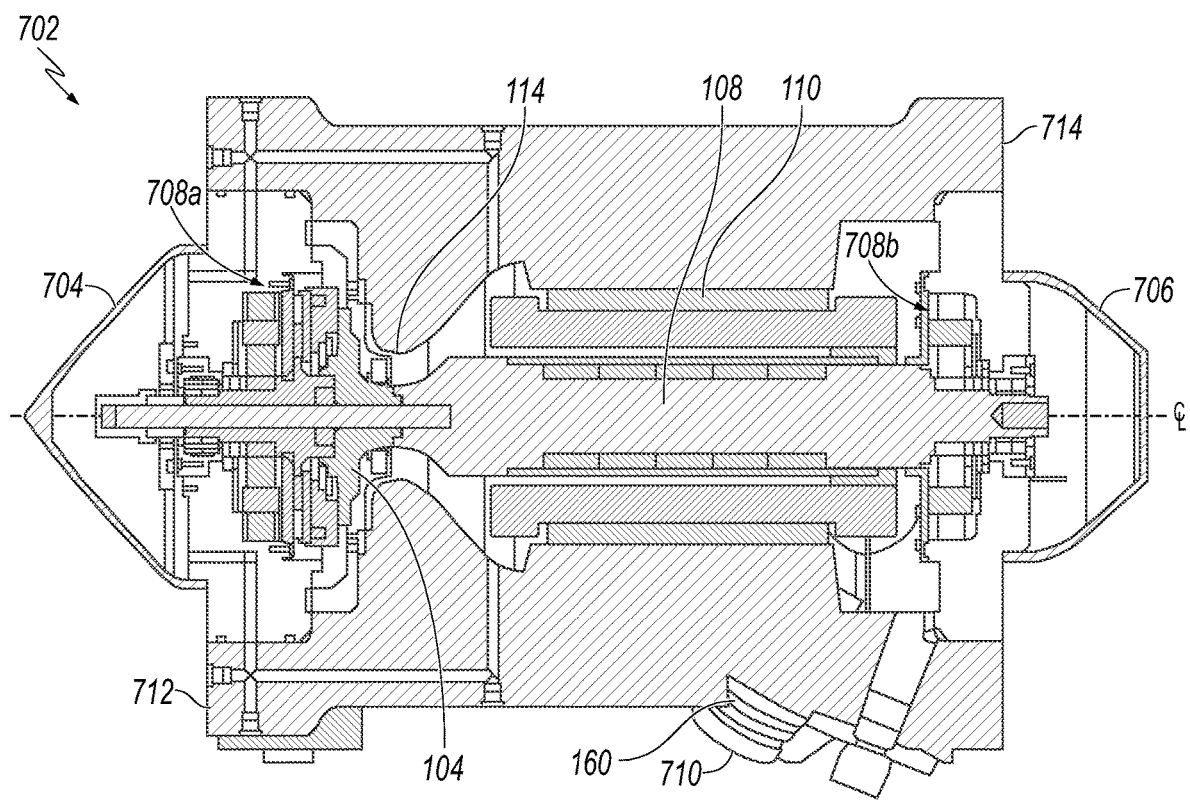

FIGS. 7A-D are schematic diagrams illustrating the turboexpander housing components in accordance with embodiments of the present disclosure. FIG. 7A is a schematic diagram illustrating the fully assembled turboexpander 102 in accordance with embodiments of the present disclosure. Turboexpander 102 can include a housing assembly 700. The housing assembly 700 can include a main housing 702, an inlet funnel 722, and an outlet funnel 742. The main housing 702 is illustrated in FIG. 7B. FIG. 7B is a schematic diagram illustrating the main housing 702 of housing assembly 700 in accordance with embodiments of the present disclosure. The main housing 702 can house the rotor shaft, the magnetic bearings 708a and 708b to support the rotor shaft 108, and the stator components 110, in addition to other components used to support the rotation of the rotor within the stator and to facilitate the flow of current to an electrical output 160 of the turboexpander 102. The main housing 702 can include design features that direct the flow of process gas in a certain way and in a certain direction, so as to cause the gas to flow in a controlled manner into the turbine wheel and towards the center of the main housing 702. For example, the main housing 702 can be designed to include a shroud 114, as described above. In some embodiments, the gas flow can be directed outwards away from the center of the turboexpander 102 without deviating from the scope of the disclosure. The design of the main housing 702 can also facilitate the process gas flow without the use of seals, as described above.

The main housing 702 can also include attachment or connection points for an inlet cone 704 and an outlet cone 706. The inlet cone 704 and outlet cone can be selected based on the process gas flow conditions without having to change the casting of the main housing 702. The inlet cone 704 and outlet cone 706 can be modular. Each design for the inlet cone 704 and the outlet cone 706 can include a common interface for mating, connecting, or otherwise affixing the inlet cone 704 and outlet cone 706 to the main housing 702. The design of the interface of the inlet cone 704 and outlet cone 706 can include a standard size and attachment points to attach the inlet cone 704 and outlet cone 706 to the main housing 702. Inlet cones of different radius of curvature, aspect ratio, and/or other design considerations can be selected based on the process gas flow conditions and affixed to the main housing 702 using the common interface. Likewise, outlet cones of different radius of curvature, aspect ratio, and/or other design considerations can be selected based on the process gas flow conditions and affixed to the main housing 702.

Figure 7C:
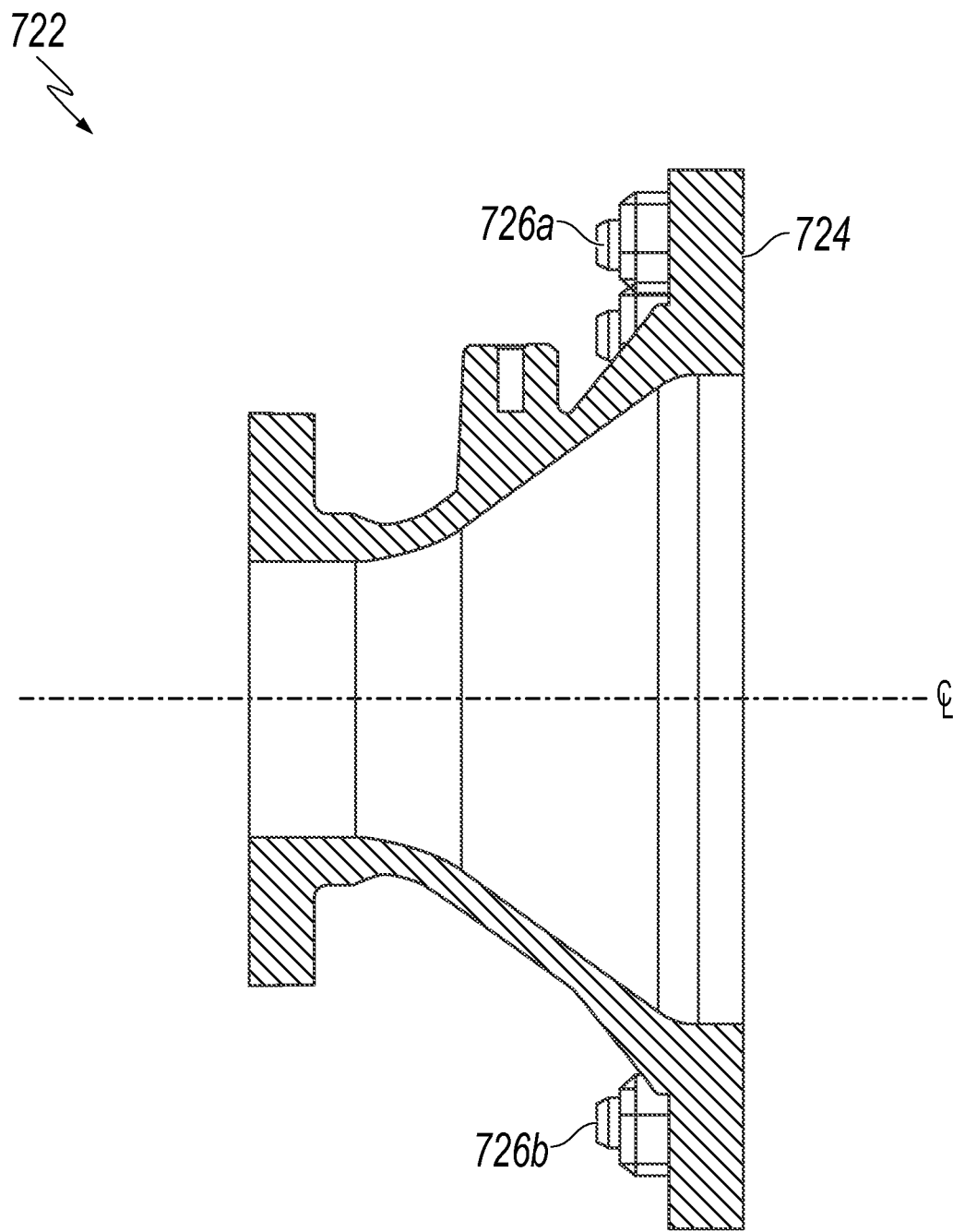
Figure 7D:
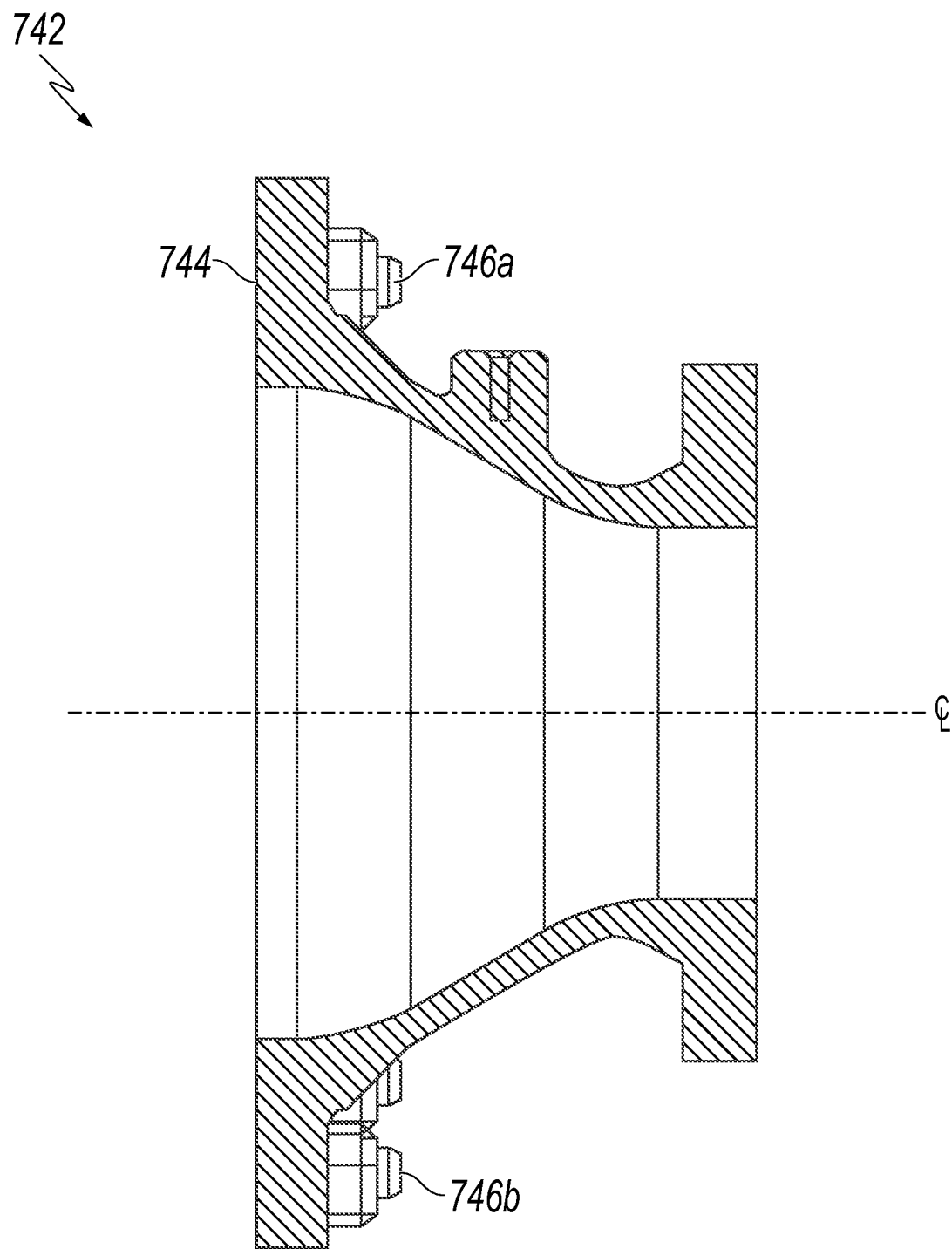

The housing assembly 700 also includes an inlet funnel 722 shown in FIG. 7C and outlet funnel 742 shown in FIG. 7D. The inlet funnel 722 is affixed to the main housing 702 at interface flange 712. The outlet funnel 742 is affixed to the main housing 702 at interface flange 714. The modularity of the inlet funnel 722 and the outlet funnel 742 allows funnels to be changed for different flow conditions and interface flange dimensions.

For example, FIG. 7C is a schematic diagram illustrating an inlet funnel 722 in accordance with embodiments of the present disclosure. Inlet funnel 722 has an inlet funnel flange 724 that can mate with interface flange 712. A plurality of bolts (e.g., bolts 726a and 726b, among others) can be used to secure the inlet funnel 722 at inlet funnel flange 724 to the inlet funnel interface flange 712 of main housing 702. FIG. 7D is a schematic diagram illustrating an outlet funnel 742 in accordance with embodiments of the present disclosure. Outlet funnel 742 has an outlet funnel flange 744 that can mate with interface flange 714. A plurality of bolts (e.g., bolts 746a and 746b, among others) can be used to secure the outlet funnel 742 at outlet funnel flange 744 to the outlet funnel interface flange 714 of main housing 702.

Figure 8:
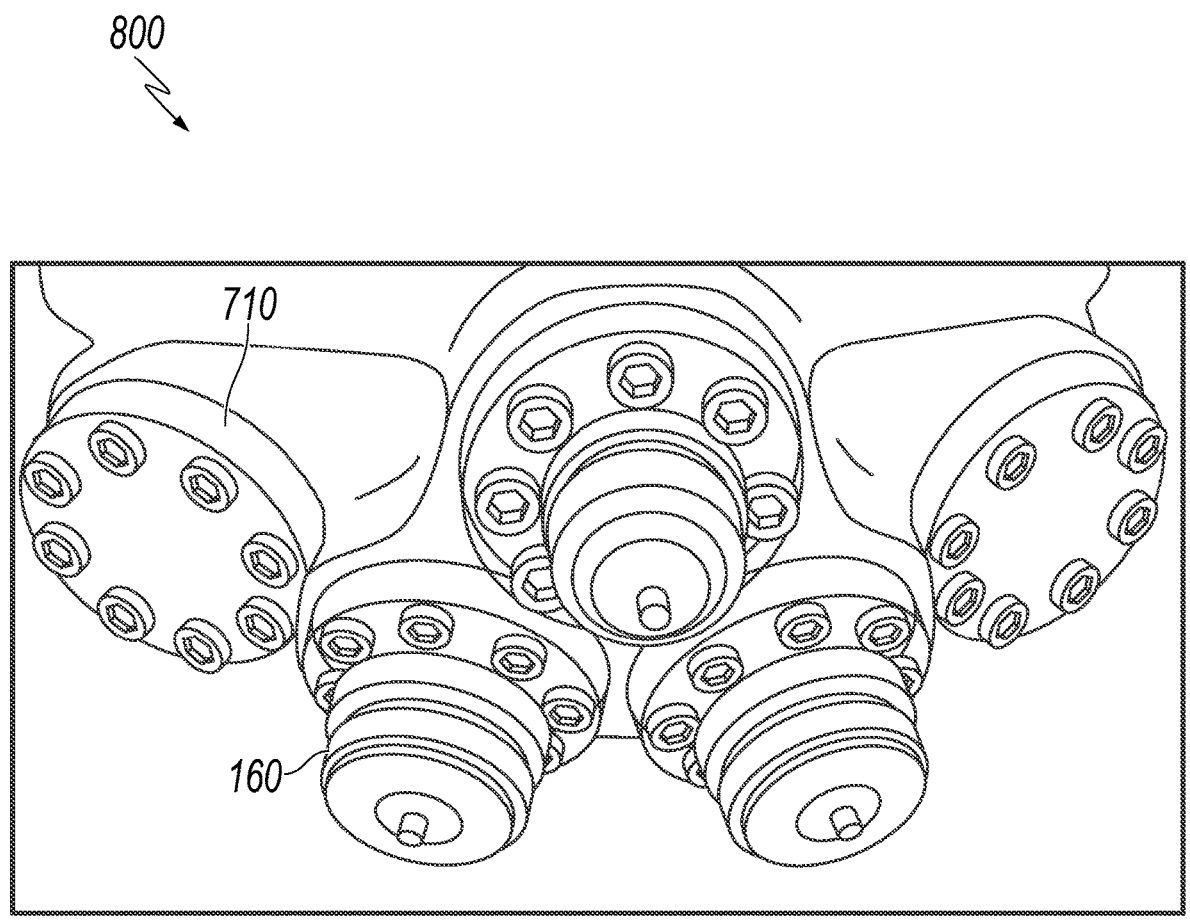
FIG. 8 is a schematic diagram of an example electrical outlets on a main housing 702 that includes a blanking plate in accordance with embodiments of the present disclosure.

Returning briefly to FIG. 7B, the main housing 702 includes electrical output 160. Electrical output 160 uses power connections to power electronics, brake resistors, loads, power grids, or other elements. Power connections are made using one or more three-phase connectors. Blanking plates 710 are used for lower power levels where not all connector locations are populated. FIG. 8 is a schematic diagram 800 of an example electrical outlets 160 on a main housing 702 that includes a blanking plate 710 in accordance with embodiments of the present disclosure. The blanking plate 710 can be used when the turboexpander is operating for an application that does not require all of the power connections to be used. For example, in certain scenarios where lower power output is used, one or more blanking plates 710 can be used to electrically isolate the electrical outputs that are not being used to connect the turboexpander electrical output to a load.

Figure 9:
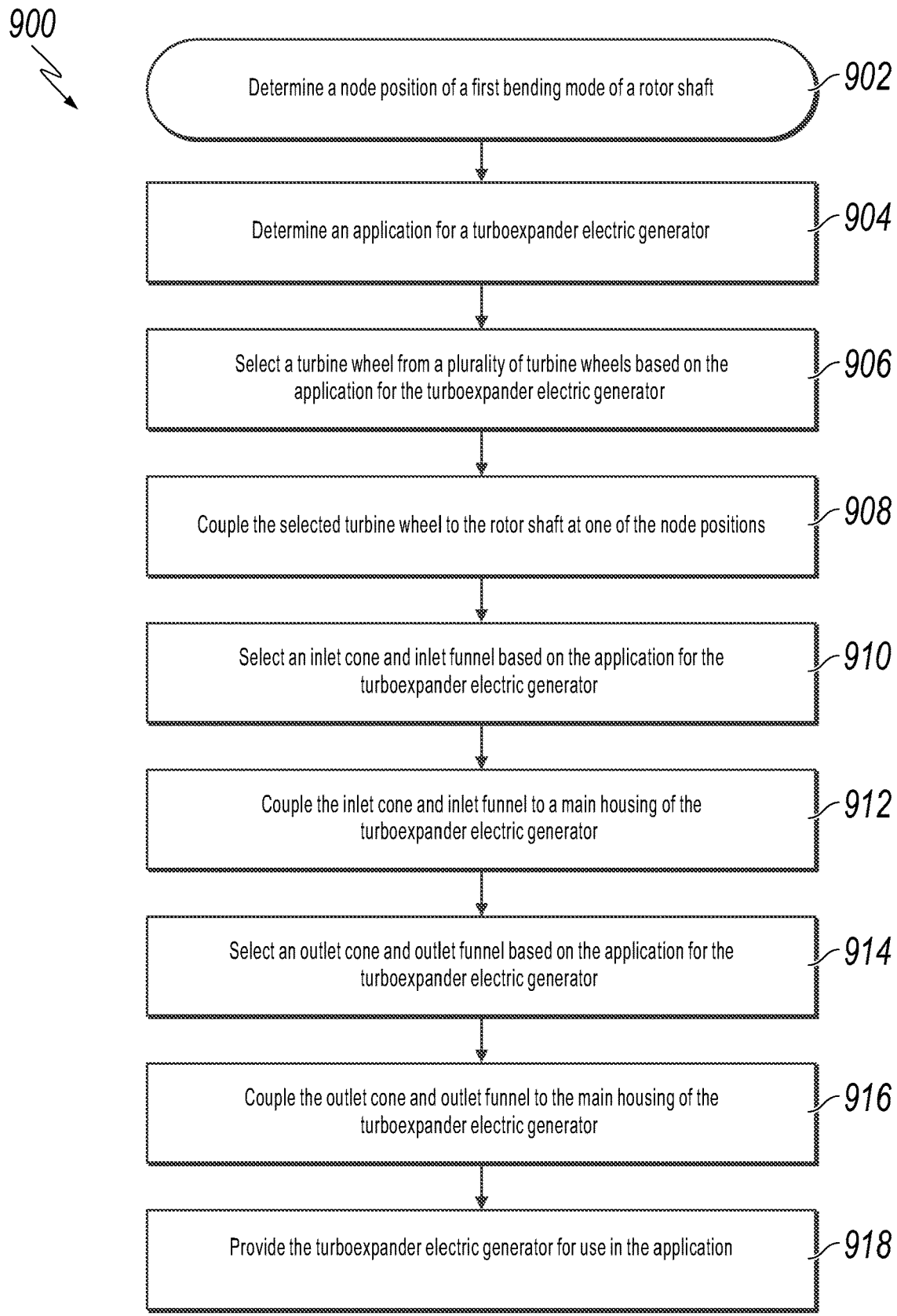
FIG. 9 is a process flow diagram for providing a turboexpander for an application in accordance with embodiments of the present disclosure.

FIG. 9 is a process flow diagram 900 for providing a turboexpander for an application in accordance with embodiments of the present disclosure. At the outset, the positions of the nodes of the first bending mode of a rotor shaft are identified. (902) The first bending mode of the shaft can have two nodes, one proximate each end of the rotor shaft, as shown in FIGS. 3 and 4A-D. The node position indicates the location where the turbine wheel will be coupled to the rotor shaft.

The turboexpander can be assembled to satisfy the conditions of the specific application it will be used in. For example, the power output from the turboexpander is related to the rotational speed of the rotor. The rotational speed of the rotor depends, in part, on the rate of process gas flow into the turbine wheel and the dimensions and design considerations of the turbine wheel itself. During assembly of the turboexpander, a turbine wheel can be selected based on the application of the turboexpander, such as the expected process gas flow conditions and the desired power output for the turboexpander. Put simply, a turbine wheel can be selected from a plurality turbine wheels based on the application of the turboexpander. (904) The selected turbine wheel can be coupled to the rotor shaft at a node position. (906)

The inlet cone and inlet funnel for the turboexpander can likewise be selected from a plurality of choices, based on the application of the turboexpander and the conditions at the operational site. (910) For example, an inlet cone and inlet funnel can be selected based on a desired pressure letdown at a pressure letdown station. Or, the inlet cone and inlet funnel can be used to tune the process gas flow rate to a desired level for the selected turbine wheel. The inlet cone and inlet funnel can be secured to the main housing of the turboexpander. (912)

Likewise, the outlet cone and outlet funnel for the turboexpander can likewise be selected from a plurality of choices, based on the application of the turboexpander and the conditions at the operational site. (914) The outlet cone and outlet funnel can be secured to the main housing of the turboexpander. (916)

The assembled turboexpander can be provided to an operational site. (918). The operational site can be, for example, a pressure letdown station or hydrogen liquefaction process station.

The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment. In the foregoing specification, a detailed description has been given with reference to specific exemplary embodiments. It will, however, be evident that various modifications and changes may be made thereto without departing from the broader spirit and scope of the disclosure as set forth in the claims.

What is claimed is:

1. An apparatus comprising:
an electric generator comprising:
a rotor shaft comprising a node position, the node position defining a position of a node of a first bending mode of the rotor shaft;
a turbine wheel coupled to the rotor shaft at the node position that corresponds to the first bending mode of the rotor shaft, the turbine wheel configured to receive process gas and rotate in response to expansion of the process gas flowing into an inlet of the turbine wheel and out of the outlet of the turbine wheel, the rotor shaft configured to rotate with the turbine wheel; and
a stationary stator, the electric generator to generate an alternating current upon rotation of the rotor shaft within the stationary stator.

2. The apparatus of claim 1, wherein the electric generator comprises a first magnetic bearing at a first position and a second magnetic bearing at a second position, the turbine wheel coupled to the rotor shaft between the first magnetic bearing and the second bearing.

3. The apparatus of claim 2, wherein the node of the first bending mode of the rotor shaft is proximate to the first position.

4. The apparatus of claim 1, wherein the rotor shaft comprises a turbine wheel attachment interface compatible with a first turbine wheel comprising a first gas inlet size and a second turbine wheel comprising a second gas inlet size, the first gas inlet size different from the second gas inlet size.

5. The apparatus of claim 1, the electric generator further comprising a housing assembly comprising:
a main housing supporting the stator;
an inlet funnel removably affixed to a first flange of the main housing; and
an inlet cone disposed within the inlet funnel and removably affixed to the main housing.

6. The apparatus of claim 5, further comprising:
an outlet funnel removably affixed to a second flange of the main housing; and
an outlet cone disposed within the outlet funnel and removably affixed to the main housing.

7. The apparatus of claim 1, wherein the turbine wheel is a first turbine wheel, the node of the first bending mode is a first node at a first node position, and wherein:
the rotor shaft comprises a second node of the first bending mode at a second node position on the rotor shaft; and
the electric generator comprises a second turbine wheel coupled to the rotor shaft at the second node position.

8. The apparatus of claim 1, wherein the turbine wheel comprises a shroud.

9. The apparatus of claim 1, the electric generator comprising a plurality of electrical outlets, each of the plurality of electrical outlets configured to receive a blanking plate.

10. The apparatus of claim 1, the rotor shaft comprising a plurality of permanent magnets.

11. A method comprising:
identifying a first bending mode of the rotor shaft;
identifying a node position of the first bending mode on the rotor shaft;
identifying an operational condition for an electric generator;
selecting a turbine wheel, from a plurality of different turbine wheels, based on the operational condition;
coupling the selected turbine wheel to the node position of the rotor shaft of the electric generator; and
providing the electric generator;
wherein coupling the selected turbine wheel to the rotor shaft of the electric generator comprises coupling the selected turbine wheel to the rotor shaft at a location collocated with the node of the first bending mode.

12. The method of claim 11, wherein the operational condition comprises one or both of a process gas flow rate or a power output rating for the electric generator.

13. The method of claim 11, further comprising:
selecting an inlet cone and an inlet funnel based on the operational condition;
coupling the selected inlet cone and inlet funnel to a main housing of the electric generator.

14. The method of claim 11, further comprising:
selecting an outlet cone and an outlet funnel based on the operational condition;
coupling the selected outlet cone and outlet funnel to a main housing of the electric generator.

15. A system comprising:
a flow control valve to control a flow of a process gas; and
an electric generator comprising:
a process gas inlet on a downstream side of the flow control valve to receive process gas into the electric generator,
a rotor shaft comprising a node position, the node position defining a position of a node of a first bending mode of the rotor shaft,
a turbine wheel coupled to the rotor shaft at the node position that corresponds to the first bending mode of the rotor shaft, the turbine wheel configured to receive process gas and rotate in response to expansion of the process gas flowing into an inlet of the turbine wheel and out of an outlet of the turbine wheel, the rotor shaft configured to rotate with the turbine wheel, and
a stationary stator, the electric generator to generate an alternating current upon rotation of the rotor shaft within the stator.

16. The system of claim 15, wherein the electric generator comprises a first magnetic bearing at a first position and a second magnetic bearing at a second position, the turbine wheel coupled to the rotor shaft between the first magnetic bearing and the second bearing.

17. The system of claim 16, wherein the node of the first bending mode of the rotor shaft is proximate to the first position.

18. The system of claim 15, wherein the rotor shaft comprises a turbine wheel attachment interface compatible with a first turbine wheel comprising a first gas inlet size and a second turbine wheel comprising a second gas inlet size, the first gas inlet size different from the second gas inlet size.

19. The system of claim 15, the electric generator further comprising a housing assembly comprising:
    a main housing supporting the stator; and
    an inlet funnel removably affixed to a first flange of the main housing.

\* \* \* \* \*